United States Patent
Nakata et al.

(10) Patent No.: US 10,388,315 B2
(45) Date of Patent: Aug. 20, 2019

(54) PERPENDICULAR MAGNETIC RECORDING MEDIUM

(71) Applicant: FUJI ELECTRIC CO., LTD., Kawasaki-shi (JP)

(72) Inventors: Hitoshi Nakata, Sendai (JP); Tomohiro Moriya, Sendai (JP); Takehito Shimatsu, Sendai (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 22 days.

(21) Appl. No.: 15/445,231

(22) Filed: Feb. 28, 2017

(65) Prior Publication Data

US 2017/0178674 A1 Jun. 22, 2017

Related U.S. Application Data

(63) Continuation of application No. PCT/JP2015/004396, filed on Aug. 31, 2015.

(30) Foreign Application Priority Data

Oct. 1, 2014 (JP) .................................. 2014-203283

(51) Int. Cl.
*G11B 5/66* (2006.01)
*G11B 5/65* (2006.01)
*G11B 5/73* (2006.01)

(52) U.S. Cl.
CPC .............. *G11B 5/653* (2013.01); *G11B 5/732* (2013.01)

(58) Field of Classification Search
CPC ....... G11B 5/653; G11B 5/732; G11B 5/7325; G11B 5/738
See application file for complete search history.

(56) References Cited

U.S. PATENT DOCUMENTS

| 2008/0057350 A1 | 3/2008 | Das et al. |
| 2012/0225325 A1 | 9/2012 | Nemoto et al. |
| 2015/0107991 A1 | 4/2015 | Sato |

FOREIGN PATENT DOCUMENTS

| JP | 2003-313659 A | 11/2003 |
| JP | 2008-059733 A | 3/2008 |
| JP | 2012-181902 A | 9/2012 |
| WO | 2014/064995 A1 | 5/2014 |

OTHER PUBLICATIONS

English machine translation of JP2003-313659A, Japan, Nov. 2003, pp. 1-17.*
International Search Report in International Application No. PCT/JP2015/004396 dated Nov. 10, 2015.

* cited by examiner

*Primary Examiner* — Holly C Rickman
(74) *Attorney, Agent, or Firm* — Venable LLP; Henry J. Daley; Kerri M. Patterson

(57) ABSTRACT

The present invention relates to a magnetic recording medium, and this magnetic recording medium includes at least a non-magnetic substrate and a magnetic recording layer. In the magnetic recording medium of the present invention, the magnetic recording layer includes an ordered alloy having an $L1_0$-ordered structure, includes Fe, Pt, and V, and has a composition of Pt>Fe. The magnetic recording layer preferably has a granular structure composed of magnetic crystal grains including the ordered alloy and a non-magnetic crystal grain boundary, and the non-magnetic crystal grain boundary includes V.

3 Claims, 6 Drawing Sheets

PERPENDICULAR MAGNETIC RECORDING MEDIUM

CROSS-REFERENCE TO RELATED APPLICATIONS

This application is a continuation application of PCT Application No. PCT/JP2015/004396 under 37 Code of Federal Regulation § 1.53 (b) and the said PCT application claims the benefit of Japanese Patent Application No. 2014-203283, filed Oct. 1, 2014, which are hereby incorporated by reference wherein in their entirety.

BACKGROUND OF THE INVENTION

Field of the Invention

The present invention relates to a perpendicular magnetic recording medium. Particularly, the present invention relates to a perpendicular magnetic recording medium having a magnetic layer comprising an ordered alloy, comprising Fe and Pt as components, and further comprising vanadium (V).

Description of the Related Art

Recently, higher density magnetic recording is in high demand. As a technology for realizing the high density of the magnetic recording, a perpendicular magnetic recording method is employed. The perpendicular magnetic recording medium includes at least a non-magnetic substrate and a magnetic recording layer formed of a hard magnetic material. The perpendicular magnetic recording medium may further include a soft magnetic under layer which plays a role of concentrating a magnetic flux generated by a magnetic head to the magnetic recording layer, an interlayer for orienting the hard magnetic material of the magnetic recording layer in an intended direction, a protective film for protecting a surface of the magnetic recording layer and the like arbitrarily and selectively.

For the purpose of obtaining favorable magnetic characteristics, formation of a magnetic recording layer of the perpendicular magnetic recording medium by using a granular magnetic material has been proposed. The granular magnetic material comprises magnetic crystal grains and a non-magnetic segregant surrounding a periphery of the magnetic crystal grains. The individual magnetic crystal grains in the granular magnetic material are magnetically separated by the non-magnetic segregant.

Moreover, as the metal magnetic material for a perpendicular magnetic recording medium, a CoCr-based disordered alloy magnetic layer including CoCrPt has been mainly studied. Recently, for the purpose of further improvement of recording density of the perpendicular magnetic recording medium, it is imminent to reduce a grain size of the magnetic crystal grain in the magnetic layer. Here, the reduction of the grain size of the magnetic crystal grain lowers thermal stability of recorded magnetization. Thus, in order to compensate for the lowering of thermal stability caused by reduction of the grain size of the magnetic crystal grain, use of a material with higher crystal magnetic anisotropy is in demand.

As the material having the higher crystal magnetic anisotropy in demand, an $L1_0$-ordered alloy and its manufacturing method are proposed. The $L1_0$-ordered alloy includes FePt, CoPt, FePd, CoPd, and the like.

With the ordered alloys as above, it is difficult to obtain better crystal grains with higher order parameter. Moreover, in the granular magnetic materials, separability of the individual magnetic crystal grains in the granular magnetic material needs to be improved so as to realize better crystallinity with higher order parameter.

Japanese Patent Laid-Open No. 2003-313659 discloses a sputter target for forming a thin film of an $L1_0$-ordered alloy. As this sputter target, an FePtV-based alloy having a composition of Fe≤Pt is described as an example in Japanese Patent Laid-Open No. 2003-313659. In Japanese Patent Laid-Open No. 2003-313659, an ordered alloy film having a high magnetic anisotropy constant (Ku), a high coercive force (Hc), and the like, can be obtained with good reproducibility by lowering an anneal temperature when a magnetic alloy film formed by sputter film deposition is ordered in an $L1_0$-ordered phase. Moreover, in Japanese Patent Laid-Open No. 2003-313659, the magnetic recording medium enables regularization of the magnetic alloy film to an $L1_0$-ordered phase at a relatively low anneal temperature and thus, practical utility and mass productivity of the magnetic recording medium using the ordered-phase alloy film with the $L1_0$-structure having a large magnetic anisotropy constant (Ku) as a recording layer are improved.

Japanese Patent Laid-Open No. 2008-059733 discloses a magnetic recording medium comprising an alloy having a high magnetic anisotropy constant (Ku) and an oxide compound, and a sputter target for forming a magnetic recording layer of such a magnetic recording medium. Japanese Patent Laid-Open No. 2008-059733 discloses that, since the magnetic recording layer has the high magnetic anisotropy constant (Ku), thermal stability is improved, and a magnetic domain of this magnetic recording layer can be made extremely small. Moreover, as the sputter target in Japanese Patent Laid-Open No. 2008-059733 for forming a thin film of the $L1_0$-ordered alloy, an FePtV oxide-based alloy is described as an example.

SUMMARY OF THE INVENTION

An object of the present invention is to provide a magnetic recording medium having a magnetic recording layer including more excellent $L1_0$-ordered alloy.

The present invention relates to a magnetic recording medium including at least a non-magnetic substrate and a magnetic recording layer, the magnetic recording layer including an ordered alloy having an $L1_0$-ordered structure, including Fe, Pt, and V, and having a composition of Pt>Fe.

In the present invention, the magnetic recording layer has a granular structure composed of magnetic crystal grains including the ordered alloy and a non-magnetic crystal grain boundary, and the non-magnetic crystal grain boundary preferably includes V.

Moreover, in an embodiment of the present invention, the magnetic recording medium of the present invention further includes a seed layer, the seed layer including Pt.

In the present invention, it is possible to improve a coercive force (Hc) of the magnetic recording layer by improving separation performances between the magnetic crystal grains.

Further features of the present invention will become apparent from the following description of exemplary embodiments (with reference to the attached drawings).

DESCRIPTION OF THE EMBODIMENTS

A magnetic recording medium of the present invention comprises a non-magnetic substrate and a magnetic recording layer, and the magnetic recording layer is formed having an ordered alloy with an $L1_0$-ordered structure. Moreover, the magnetic recording layer comprises Fe, Pt, and V and has a composition of Pt>Fe.

Figure 1:
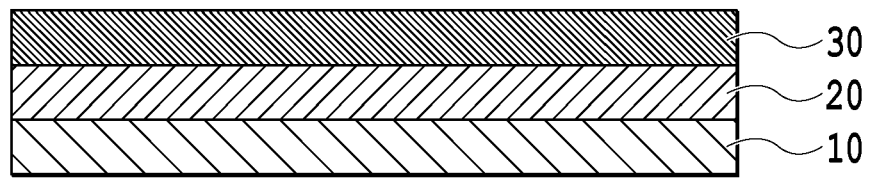
FIG. 1 is a schematic sectional view illustrating one configuration example of a magnetic recording medium of the present invention.

The present invention will be described below with reference to the attached drawings but the present invention is not limited to them. In an embodiment of the present invention, the magnetic recording medium can include a non-magnetic substrate 10, a magnetic recording layer 30, and an optional seed layer 20 as illustrated in FIG. 1.

The non-magnetic substrate 10 may be various substrates whose surfaces are smooth. For the non-magnetic substrate, a material used in general for the magnetic recording medium can be used. For example, the material which can be used for the non-magnetic substrate 10 includes a NiP-plated Al alloy, reinforced glass, crystalized glass, MgO, or the like.

The magnetic recording layer 30 comprises iron (Fe), platinum (Pt), and vanadium (V). The magnetic recording layer 30 comprises an ordered alloy, and the ordered alloy preferably has an $L1_0$-structure. A particularly preferable $L1_0$-ordered alloy is FePt.

In the ordered alloy used in the present invention, a ratio between Fe and Pt is Fe<Pt by at %. Preferably, contents of Fe and Pt in the ordered alloy satisfy the condition of Fe (at %)<Pt (at %) in contents of the respective elements forming the $L1_0$-ordered alloy. More preferably, the contents of Fe and Pt are such that Fe is 40 to 45 at % and Pt is 45 to 55 at % under the condition of Fe (at %)<Pt (at %). Moreover, a content of V in the magnetic recording layer is 3 to 12 at % or preferably 3.5 to 12 at %. The ordered alloy with the $L1_0$-ordered structure which can improve the coercive force (Hc) can be obtained by use of the composition ratio within this range.

The element V in the magnetic recording layer used in the present invention is preferably V in a zero-valent oxidized state, that is, V in a metal state. Although it is not intended to be restricted by any theory, V is considered to be precipitated to an outside of FePt of the $L1_0$-ordered alloy to improve phase separation. In the present invention, the ordered alloy does not comprise V in the more highly oxidized state such as a V oxide.

In the present invention, the order parameter of the ordered alloy can be obtained, for example, by measuring the magnetic recording layer using an X-ray diffraction method (XRD), and calculating a ratio between a measured value and a theoretical value when the alloy is completely ordered. In the case of the $L1_0$-ordered alloy, it can be calculated by using integrated intensity of (001) and (002) peaks derived from the ordered alloy. The order parameter S can be obtained as a square root of a quotient of the ratio of (001) FePt peak integrated intensity to the measured (002) FePt peak integrated intensity divided by a ratio of the (001) peak integrated intensity to the (002) peak integrated intensity calculated theoretically when it is completely ordered.

The magnetic recording layer of the magnetic recording medium of the present invention preferably has a granular structure composed of a non-magnetic amorphous grain boundary comprising V surrounding magnetic crystal grains made of FePt of the ordered alloy. In the granular structure, the respective magnetic crystal grains are magnetically separated by the non-magnetic grain boundary.

In the present invention, the magnetic recording layer is preferably formed by a sputtering method with heating of the substrate. The sputtering method includes general processes such as a DC magnetron sputtering method and an RF sputtering method, well-known in the art, and these general methods can be used in the present invention. In this Description, the term "sputtering method" has the same meaning to the aforementioned general method unless otherwise specified. A substrate temperature when the magnetic recording layer is formed is preferably within a range of 400 to 500° C. The order parameter S of the $L1_0$-ordered alloy material in the magnetic recording layer can be improved by employing the substrate temperature within this range. As a target to be used in the sputtering method, the sputtering method using two targets, that is, a target made of Fe and Pt and a target made of V, for example, can be employed. Alternatively, the sputtering method using three targets, that is, a target made of Fe, a target made of Pt, and a target made of V may be employed. In these cases, a ratio among Fe, Pt, and V in the ordered alloy of the magnetic recording layer 30 can be controlled by supplying power to the respective targets separately.

When the magnetic recording layer having the granular structure is to be formed, a target in which a material for forming the magnetic crystal grains and a material for forming the non-magnetic crystal grain boundary are mixed at a predetermined ratio may be used. Alternatively, a target made of a material forming the magnetic crystal grains and a target made of a material forming the non-magnetic crystal grain boundary may be used. As described above, a plurality of targets can be used as the target for forming the magnetic crystal grains. In this case, a ratio between the magnetic crystal grains and the non-magnetic crystal grain boundary in the magnetic recording layer can be controlled by supplying power to the respective targets, separately.

In the present invention, a layer for magnetic recording may be a single layer of the magnetic recording layer 30 or may be a laminated body of a plurality of layers with the other layers added to the magnetic recording layer 30. If the layer in charge of magnetic recording is constituted by a plurality of layers, the layers to be added to the magnetic recording layer 30 may be a layer for the purpose of Curie temperature (Tc) control, a cap layer for adjusting magnetization inversion, an exchange coupling control layer for controlling exchange coupling between two magnetic layers, a magnetic layer for controlling magnetic properties, a magnetic layer for controlling a ferromagnetic resonance frequency directed to a microwave assisted magnetic recording, and the like. These layers can be formed by using any process known in the art including the sputtering method. These layers are disposed integrally with and inseparably from the magnetic recording layer 30. If the laminated body of a plurality of the layers with the other layers added to the magnetic recording layer 30 is employed, description on arrangement such as above or below of the magnetic recording layer 30 should be understood as above, below, and the like, of the laminated body.

The magnetic recording medium of the present invention may further include one or a plurality of layers selected from a group of an adhesive layer, a heat-sink layer, a soft magnetic under layer, an interlayer and the seed layer 20 between the non-magnetic substrate 10 and the magnetic recording layer 30. Moreover, the magnetic recording medium of the present invention may further include a protective layer on the magnetic recording layer 30. Furthermore, the magnetic recording medium of the present invention may further include a liquid-lubricant layer on the magnetic recording layer 30 or the protective layer.

The adhesive layer which may be provided optionally is used for improving adhesiveness between the layer formed thereon and the layer (including the non-magnetic substrate 10) formed therebelow. If the adhesive layer is to be provided on an upper surface of the non-magnetic substrate 10, the adhesive layer 20 may be formed by using a material with favorable adhesiveness with the aforementioned material of the non-magnetic substrate 10. Such materials include metals such as Ni, W, Ta, Cr, and Ru, and an alloy comprising the aforementioned metal. Alternatively, the adhesive layer may be formed between two constituting layers other than the non-magnetic substrate 10. The adhesive layer may be a single layer or have a lamination structure of a plurality of layers.

The soft magnetic under layer which may be provided optionally improves writing and reading characteristics of the magnetic recording medium by controlling a magnetic flux from the magnetic head. A material for forming the soft magnetic under layer includes crystalline materials such as an NiFe alloy, a Sendust (FeSiAl) alloy, and a CoFe alloy, fine crystalline materials such as FeTaC, CoFeNi, and CoNiP, and amorphous materials including Co alloys such as CoZrNb and CoTaZr. An optimal value of the thickness of the soft magnetic under layer depends on the structure and the characteristics of the magnetic head used for the magnetic recording. When forming the soft magnetic under layer continuously with the other layers, in view of productivity, the soft magnetic under layer preferably has a thickness within a range of 10 to 500 nm (both inclusive).

When the magnetic recording medium of the present invention is to be used in a heat assisted magnetic recording method, a heat-sink layer may be provided. The heat-sink layer is a layer for effectively absorbing excess heat of the magnetic recording layer 30 generated in the heat assisted magnetic recording. The heat-sink layer can be formed by use of a material with high heat conductivity and specific heat capacity. Such materials include a Cu simple substance, an Ag simple substance, an Au simple substance or an alloy material mainly composed of them. Here, the phrase "mainly composed of" means that a content of the material concerned is 50 wt % or more. Moreover, from the viewpoint of strength or the like, the heat-sink layer can be formed by use of an Al—Si alloy, a Cu—B alloy, and the like. Moreover, the heat-sink layer can be formed by use of a Sendust (FeSiAl) alloy, a soft magnetic CoFe alloy, or the like. A function of concentrating a magnetic field in a perpendicular direction generated by the head to the magnetic recording layer can be given to the heat-sink layer, and the function of the soft magnetic under layer can be also complemented, by use of the soft magnetic material. An optimal value of the thickness of the heat-sink layer is changed depending on a heat capacity and heat distribution in the heat assisted magnetic recording as well as layer constitution of the magnetic recording medium and a thickness of each constituent layer. In the case of continuous film formation with the other constituent layers or the like, the thickness of the heat-sink layer is preferably 10 nm or more and 100 nm or less in view of a balance with productivity. The heat-sink layer can be formed by use of any process known in the art such as a sputtering method and a vacuum deposition method. In normal cases, the heat-sink layer is formed by use of the sputtering method. The heat-sink layer can be provided between the non-magnetic substrate 10 and the adhesive layer, between the adhesive layer and the interlayer, and the like, in consideration of the properties required for the magnetic recording medium.

The interlayer is a layer for controlling crystallinity and/or crystal orientation of the seed layer 20 formed thereabove. The interlayer may be a single layer or a multiple layer. The interlayer is preferably a non-magnetic film formed of Cr metal or an alloy in which at least one kind of metal selected from a group consisting of Mo, W, Ti, V, Mn, Ta, and Zr is added to Cr which is a main component. The interlayer can be formed by use of any process known in the art such as the sputtering method.

Functions of the seed layer 20 are to ensure adhesiveness between a layer below that such as the interlayer and the magnetic recording layer 30, and to control a grain size and crystal orientation of the magnetic crystal grains of the magnetic recording layer 30 which is an upper layer. The seed layer 20 is preferably non-magnetic. In addition, when the magnetic recording medium of the present invention is used in the heat assisted magnetic recording method, the seed layer 20 preferably controls, as a thermal barrier, a temperature rise and temperature distribution of the magnetic recording layer 30. In order to control the temperature rise and the temperature distribution of the magnetic recording layer 30, the seed layer 20 preferably satisfies both a function of rapidly raising the temperature of the magnetic recording layer 30 when the magnetic recording layer 30 is heated during heat assisted recording and a function to transfer the heat in the magnetic recording layer 30 to the underlying layer such as the interlayer by heat conduction in a depth direction before an in-plane direction heat conduction in the magnetic recording layer 30 occurs.

In order to achieve the aforementioned functions, a material of the seed layer 20 is appropriately selected in accordance with the material of the magnetic recording layer 30. More specifically, the material of the seed layer 20 is selected in accordance with the material of the magnetic crystal grain of the magnetic recording layer. For example, if the magnetic crystal grain of the magnetic recording layer 30 is formed of the $L1_0$-ordered alloy, the seed layer is preferably formed by use of Pt metal or an NaCl type compound. Particularly, in the present invention, the seed layer 20 is preferably formed by use of Pt. If the seed layer 20 is formed by lamination of a plurality of layers, an oxide such as MgO or $SrTiO_3$ or a nitride such as TiN can be also used in addition to the aforementioned materials. From viewpoints of improvement of crystallinity of the magnetic crystal grain of the magnetic recording layer 30 and of improvement of productivity, the seed layer 20 preferably has a thickness of 1 to 60 nm or preferably of 1 to 20 nm. The seed layer 20 can be formed by use of any process such as the sputtering method or the vacuum deposition method well-known in the technology concerned.

The protective layer can be formed by use of a material conventionally used in a field of the magnetic recording medium. Specifically, the protective layer can be formed by use of a non-magnetic metal such as Pt, a carbon-based material such as diamond-like carbon or a silicon-based material such as silicon nitride. Moreover, the protective layer may be a single layer or have a lamination structure. The protective layer with the lamination structure may have a lamination structure of two kinds of carbon-based materials with different characteristics, a lamination structure of metal and the carbon-based material or a lamination structure of a metal oxide film and the carbon-based material, for example. The protective layer can be formed by use of any process known in the art such as the sputtering method, a CVD method, and the vacuum deposition method.

The liquid lubricant layer can be formed by use of a material conventionally used in the field of the magnetic recording medium. A perfluoropolyether-based lubricant, for example, can be used. The liquid lubricant layer can be formed by use of a coating method such as a dip-coating method or a spin-coating method.

EXAMPLE

Example 1

A (001) MgO single-crystal substrate (manufactured by Tateho Chemical Industries Co., Ltd.) having a smooth surface was washed, and the non-magnetic substrate 10 was prepared. The non-magnetic substrate 10 after the washing was introduced into a sputter device. After the non-magnetic substrate 10 was heated to 350° C., the Pt seed layer 20 having a thickness of 20 nm was formed by an RF magnetron sputtering method using a Pt target in an Ar gas at a pressure of 0.4 Pa.

Subsequently, after the non-magnetic substrate 10 on which the seed layer 20 was formed was heated to 350° C., the FePtV magnetic recording layer 30 having a thickness of 10 nm was formed by the simultaneous RF magnetron sputtering method using an FePt target and a V target of a single element in an Ar gas at a pressure of 0.6 Pa, and the magnetic recording medium having the structure illustrated in FIG. 1 was obtained. Here, as the FePt target, the one having an Fe/Pt ratio of 45/55 was used. Moreover, the power to be applied to the FePt target was fixed to 300 W and the power to be applied to the V target was changed from 40 to 450 W, and thereby the content of V in the magnetic recording layer 30 was adjusted. A composition of the manufactured magnetic recording medium is shown in Table 1.

Comparative Examples 1 and 2

Similarly to the aforementioned Example 1 except that targets with the Fe/Pt ratios of 50/50 (Comparative Example 1) and of 54/46 (Comparative Example 2) were used as the FePt targets, the magnetic recording medium was prepared. The compositions of the manufactured magnetic recording mediums are shown in Tables 2 and 3.

(Evaluation)

It was confirmed by XRD that the magnetic recording layer 30 of the resultant magnetic recording medium had the $L1_0$-ordered structure. Moreover, lengths of the a-axis and the c-axis of the crystal lattice with the $L1_0$-ordered structure were measured by XRD. Moreover, the order parameter S was obtained from XRD.

Furthermore, saturation magnetization (Ms) of the obtained magnetic recording medium was obtained by use of a vibrating sample magnetometer (VSM). Moreover, a hysteresis curve was measured by VSM, and the coercive force (Hc) was measured. Moreover, the composition of the magnetic recording layer 30 of the resultant magnetic recording medium was measured by the Rutherford backscattering method (RBS). A torque working in each direction of the sample was measured by a torque magnetometer with the sample placed in a magnetic field being rotated, and a magnetic anisotropy constant (Ku) was obtained.

A result of measurement of lengths of the a-axis and the c-axis of the crystal lattice with the $L1_0$-ordered structure and the value of the order parameter S are shown in Tables 1 to 3. Table 1 is the result of the Fe/Pt ratio of 45/55 (Example 1), Table 2 is the result of the Fe/Pt ratio of 50/50 (Comparative Example 1), and Table 3 is the result of the Fe/Pt ratio of 54/46

Comparative Example 2

TABLE 1

Composition of magnetic recording layer and evaluation of crystal structure

| Sample number | Fe content (at. %) | Pt content (at. %) | V added amount (at. %) | c-axis length (Å) | a-axis length (Å) | Order parameter S |
|---|---|---|---|---|---|---|
| 1 | 44.8 | 55.2 | 0.0 | 3.703 | 3.907 | 0.55 |
| 2 | 44.1 | 54.1 | 1.8 | 3.706 | 3.902 | 0.54 |
| 3 | 43.7 | 52.6 | 3.7 | 3.710 | 3.898 | 0.55 |
| 4 | 42.8 | 51.1 | 6.1 | 3.699 | 3.903 | 0.47 |
| 5 | 41.8 | 49.4 | 8.8 | 3.704 | 3.896 | 0.58 |
| 6 | 40.7 | 47.7 | 11.6 | 3.702 | 3.893 | 0.55 |
| 7 | 39.6 | 46.1 | 14.4 | 3.707 | 3.884 | 0.60 |
| 8 | 38.3 | 44.7 | 17.0 | 3.728 | 3.860 | 0.64 |

TABLE 2

Composition of magnetic recording layer and evaluation of crystal structure

| Sample number | Fe content (at. %) | Pt content (at. %) | V added amount (at. %) | c-axis length (Å) | a-axis length (Å) | Order parameter S |
|---|---|---|---|---|---|---|
| 1 | 49.5 | 50.5 | 0.0 | 3.677 | 3.908 | 0.62 |
| 2 | 48.8 | 48.9 | 2.3 | 3.680 | 3.906 | 0.58 |
| 3 | 48.1 | 47.8 | 4.1 | 3.679 | 3.905 | 0.55 |
| 4 | 46.8 | 46.7 | 6.4 | 3.682 | 3.900 | 0.54 |
| 5 | 45.4 | 45.8 | 8.8 | 3.685 | 3.894 | 0.56 |
| 6 | 44.2 | 44.1 | 11.7 | 3.694 | 3.889 | 0.62 |
| 7 | 42.9 | 42.5 | 14.6 | 3.692 | 3.879 | 0.63 |
| 8 | 41.6 | 41.3 | 17.0 | 3.695 | 3.869 | 0.60 |
| 9 | 40.7 | 40.0 | 19.3 | 3.698 | 3.857 | 0.54 |

TABLE 3

Composition of magnetic recording layer and evaluation of crystal structure

| Sample number | Fe content (at. %) | Pt content (at. %) | V added amount (at. %) | c-axis length (Å) | a-axis length (Å) | Order parameter S |
|---|---|---|---|---|---|---|
| 1 | 54.2 | 45.8 | 0.0 | 3.661 | 3.903 | 0.60 |
| 2 | 51.1 | 46.7 | 2.2 | 3.669 | 3.902 | 0.61 |
| 3 | 50.8 | 44.9 | 4.3 | 3.669 | 3.898 | 0.55 |
| 4 | 49.4 | 44.2 | 6.4 | 3.674 | 3.891 | 0.53 |
| 5 | 48.4 | 42.9 | 8.7 | 3.679 | 3.884 | 0.60 |
| 6 | 47.1 | 41.2 | 11.7 | 3.682 | 3.880 | 0.63 |
| 7 | 45.7 | 39.7 | 14.6 | 3.720 | 3.836 | 0.64 |
| 8 | 44.5 | 38.4 | 17.1 | 3.689 | 3.860 | 0.55 |
| 9 | 42.9 | 37.6 | 19.5 | 3.733 | 3.839 | 0.46 |

Figure 2:
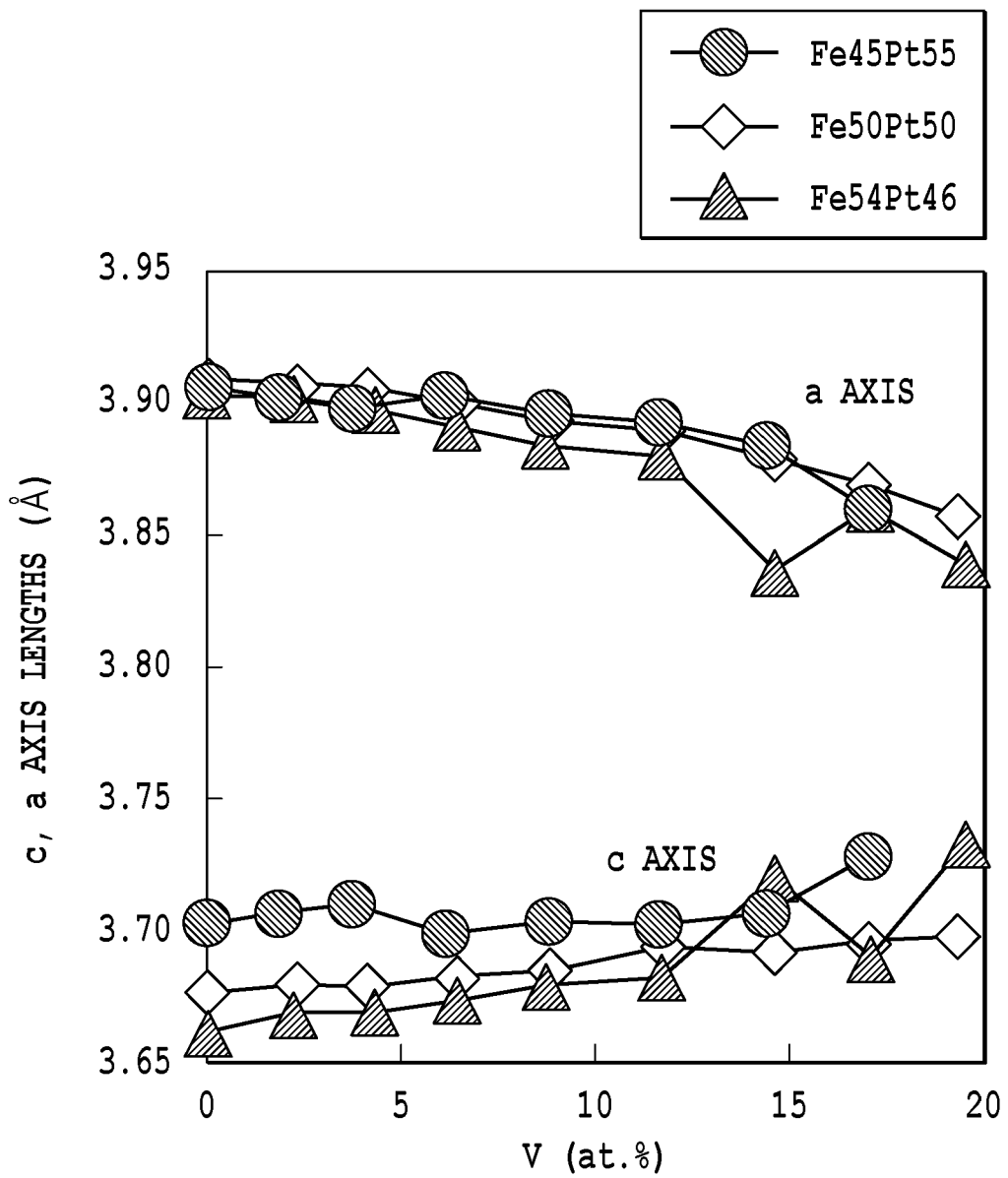
FIG. 2 is a graph showing a relationship between an V content in the magnetic recording medium and lengths of an a-axis and a c-axis of a crystal lattice in Example 1 and Comparative Examples 1 and 2.
Figure 3:
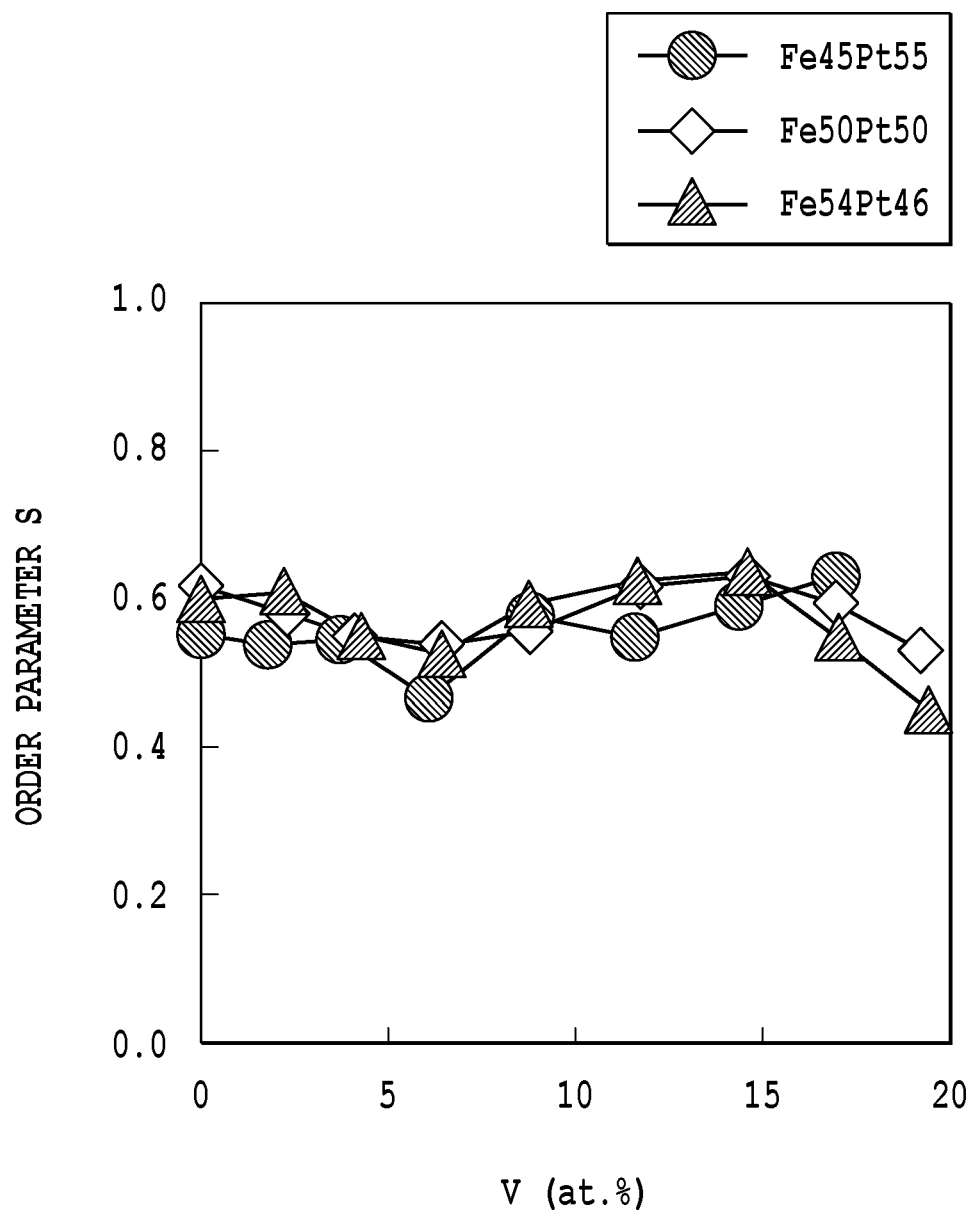
FIG. 3 is a graph showing a relationship between the V content in the magnetic recording medium and an order parameter S in Example 1 and Comparative Examples 1 and 2.

A relationship between the V content of the magnetic recording layer 30 and the lengths of the a-axis and the c-axis of the crystal lattice is shown in FIG. 2. As is known from FIG. 2, even though the V content increased, both the a-axis and the c-axis of the crystal lattice were hardly changed. From this fact, it is presumed that V is not contained in the crystal of FePt. That is, it is considered that V is deposited to an outside of FePt, the grain boundary is formed by V, and the FePt magnetic crystal grain is phase-separated by V. Moreover, the relationship between the V content of the magnetic recording layer 30 and the order parameter S is shown in FIG. 3. As is known from FIG. 3, even though the V content increased, the order parameter S was substantially constant. If V is contained in the crystal of FePt, it is considered that the order parameter S lowers. Therefore, also from the result of this order parameter S, it is considered that V is not contained in the crystal of FePt.

Subsequently, for each of samples 1 to 6 of the aforementioned Example 1 and Comparative Examples 1 and 2, measurement results of the saturation magnetization (Ms), the coercive force (Hc), and the magnetic anisotropy constant (Ku) are shown in Table 4 (Example 1), Table 5 (Comparative Example 1), and Table 6 (Comparative Example 2).

TABLE 4

Composition of magnetic recording layer and evaluation of magnetic characteristics

| Sample number | Fe content (at. %) | Pt content (at. %) | V added amount (at. %) | Saturation magnetization (Ms) (emu/cm$^3$) | coercive force (Hc) (kOe) | Magnetic anisotropy constant (Ku) (Merg/cm$^3$) |
|---|---|---|---|---|---|---|
| 1 | 44.8 | 55.2 | 0.0 | 900 | 3.6 | 21.2 |
| 2 | 44.1 | 54.1 | 1.8 | 863 | 3.1 | 20.3 |
| 3 | 43.7 | 52.6 | 3.7 | 830 | 4.4 | 19.2 |
| 4 | 42.8 | 51.1 | 6.1 | 773 | 5.9 | 17.2 |
| 5 | 41.8 | 49.4 | 8.8 | 747 | 5.5 | 14.4 |
| 6 | 40.7 | 47.7 | 11.6 | 681 | 5.5 | 8.9 |

TABLE 5

Composition of magnetic recording layer and evaluation of magnetic characteristics

| Sample number | Fe content (at. %) | Pt content (at. %) | V added amount (at. %) | Saturation magnetization (Ms) (emu/cm$^3$) | coercive force (Hc) (kOe) | Magnetic anisotropy constant (Ku) (Merg/cm$^3$) |
|---|---|---|---|---|---|---|
| 1 | 49.5 | 50.5 | 0.0 | 982 | 3.2 | 30.0 |
| 2 | 48.8 | 48.9 | 2.3 | 917 | 2.8 | 26.7 |
| 3 | 48.1 | 47.8 | 4.1 | 889 | 3.6 | 22.7 |
| 4 | 46.8 | 46.7 | 6.4 | 838 | 3.1 | 17.0 |
| 5 | 45.4 | 45.8 | 8.8 | 769 | 2.2 | 12.8 |
| 6 | 44.2 | 44.1 | 11.7 | 683 | 2.0 | 7.9 |

TABLE 6

Composition of magnetic recording layer and evaluation of magnetic characteristics

| Sample number | Fe content (at. %) | Pt content (at. %) | V added amount (at. %) | Saturation magnetization (Ms) (emu/cm$^3$) | coercive force (Hc) (kOe) | Magnetic anisotropy constant (Ku) (Merg/cm$^3$) |
|---|---|---|---|---|---|---|
| 1 | 54.2 | 45.8 | 0.0 | 1068 | 2.4 | 31.2 |
| 2 | 51.1 | 46.7 | 2.2 | 984 | 2.2 | 27.6 |
| 3 | 50.8 | 44.9 | 4.3 | 920 | 1.7 | 20.1 |
| 4 | 49.4 | 44.2 | 6.4 | 856 | 1.6 | 13.7 |
| 5 | 48.4 | 42.9 | 8.7 | 776 | 1.2 | 11.0 |
| 6 | 47.1 | 41.2 | 11.7 | 706 | 1.2 | 6.4 |

Figure 4:
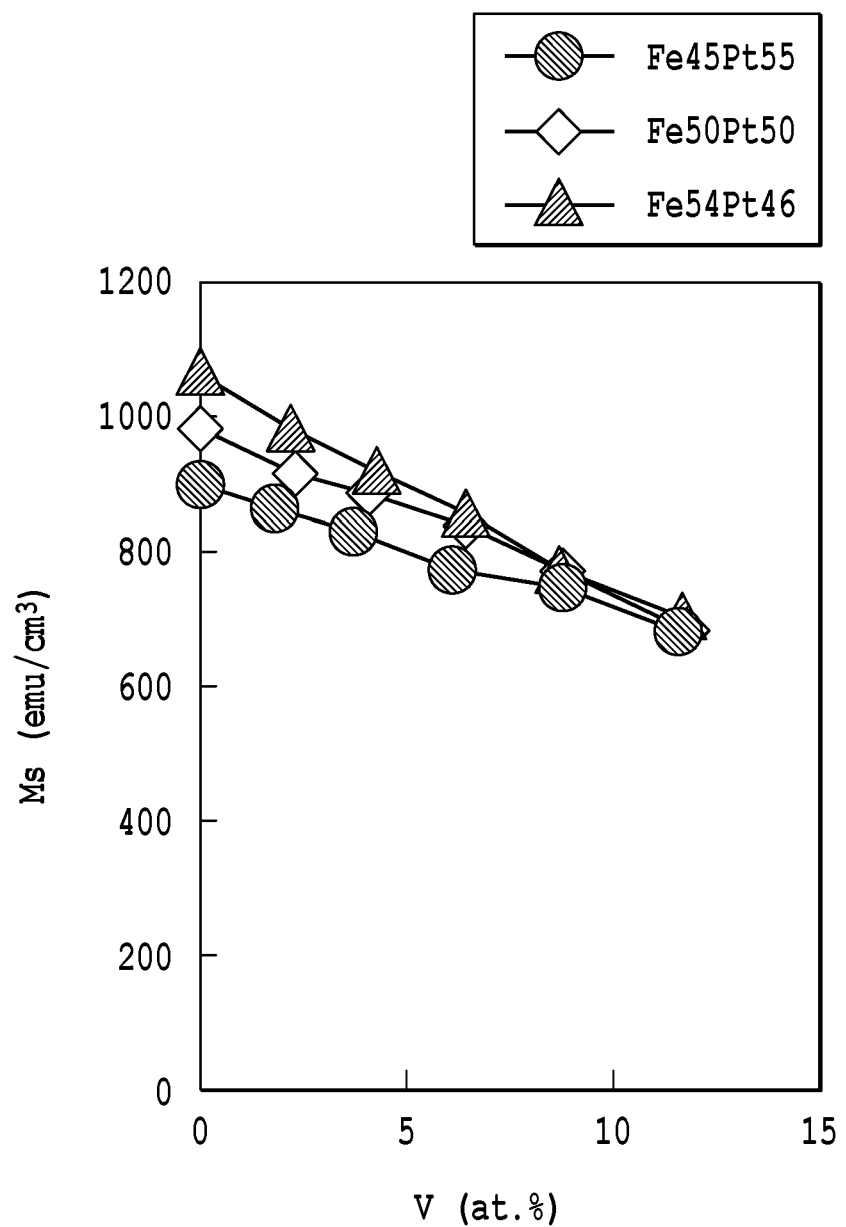
FIG. 4 is a graph showing a relationship between the V content in the magnetic recording medium and saturation magnetization (Ms) in samples 1 to 6 in Example 1 and Comparative Examples 1 and 2.
Figure 5:
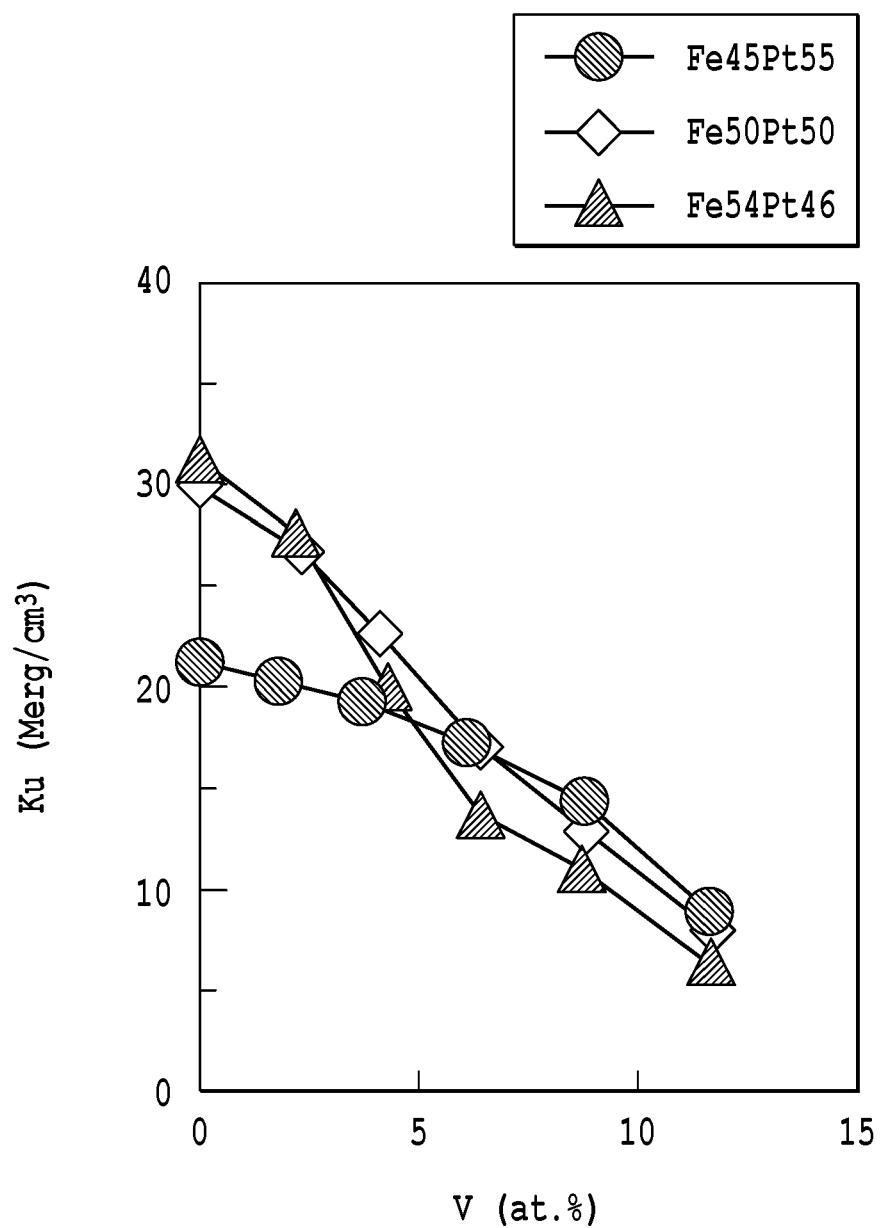
FIG. 5 is a graph showing a relationship between the V content in the magnetic recording medium and a magnetic anisotropy content (Ku) in the samples 1 to 6 in Example 1 and Comparative Examples 1 and 2.
Figure 6:
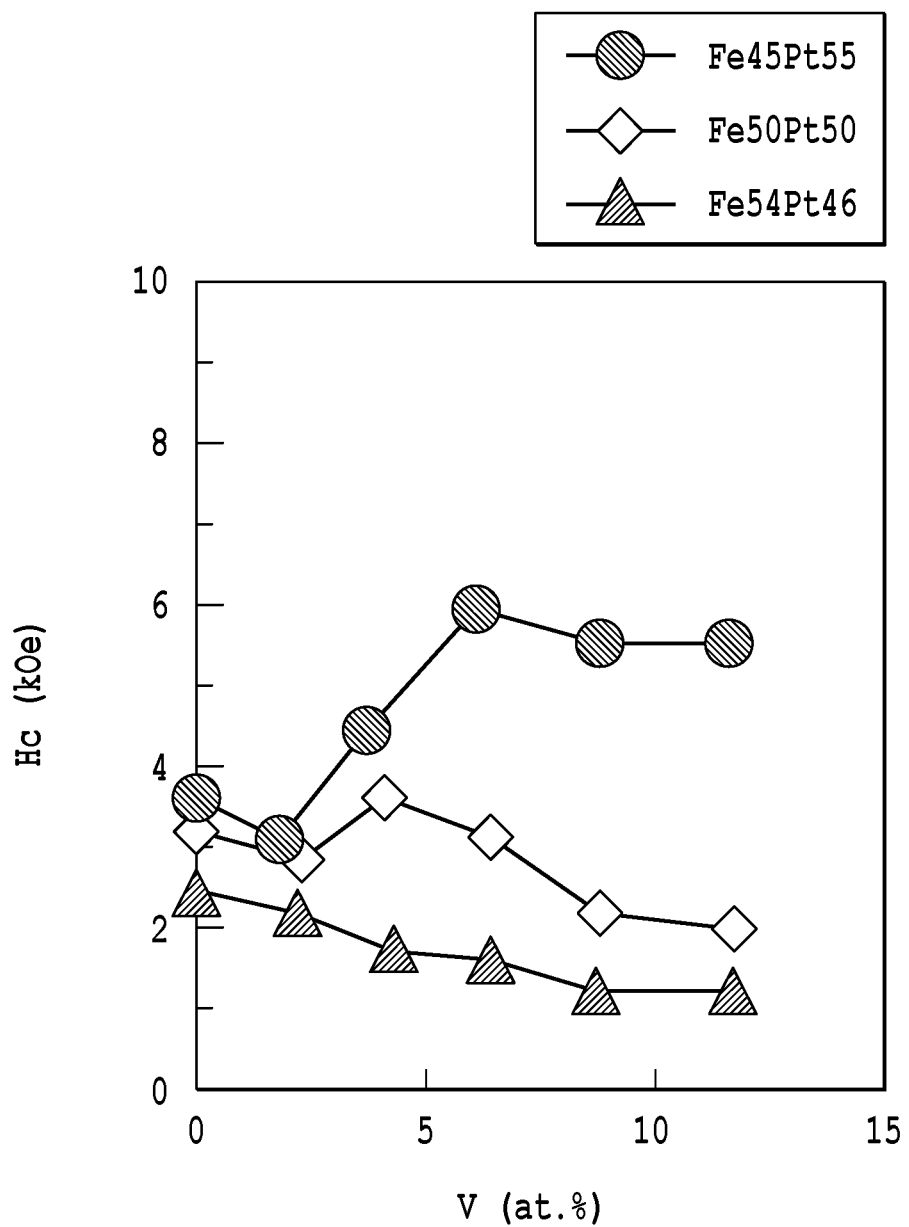
FIG. 6 is a graph showing a relationship between the V content in the magnetic recording medium and a coercive force (Hc) in the samples 1 to 6 in Example 1 and Comparative Examples 1 and 2.

A relationship between the V content of the magnetic recording layer 30 and the saturation magnetization (Ms) is shown in FIG. 4. Moreover, the relationship between the V content of the magnetic recording layer 30 and the magnetic anisotropy constant (Ku) is shown in FIG. 5. Furthermore, the relationship between the V content of the magnetic recording layer 30 and the coercive force (Hc) is shown in FIG. 6. As is shown in FIGS. 4 and 5, in Example 1 and Comparative Examples 1 and 2, even though the V content was increased, the saturation magnetization (Ms) and the magnetic anisotropy constant (Ku) were not increased. On the other hand, as illustrated in FIG. 6, if the V content was increased, the coercive force (Hc) of the magnetic recording medium in Example 1 was significantly increased as compared with the coercive force (Hc) of the magnetic recording mediums in Comparative Examples 1 and 2. Particularly, Hc was increased at the V added amount of 1.8<V<11.6 (at %). Moreover, the value of Hc indicated a maximum value of 5.9 kOe with the composition of FePtV in Example 1 at Fe42.8Pt51.1V6.1.

From the aforementioned results, it was found that V was a material for increasing Hc with respect to the FePt ordered alloy.

Moreover, in the present invention, as the V content increases, Hc increases even though both Ms and Ku decrease monotonously.

The reason why Hc increases regardless of the decrease of Ms and Ku as in the present invention is not known at the present time, but presumption as below can be made.

It is said that Hc has a relationship in the following equation with Ku and Ms.

$$Hc = A(2Ku/Ms)$$

wherein A is a coefficient representing a magnetic separation performance between the magnetic grains.

In verification with the composition of Fe45Pt55, Ku/Ms is substantially constant in Example 1 as indicated in Table 7 below.

TABLE 7

Ku/Ms value

| ample number | Ms | Ku | Ku/Ms |
|---|---|---|---|
| 1 | 900 | 21.2 | 0.023556 |
| 2 | 863 | 20.3 | 0.023523 |
| 3 | 830 | 19.2 | 0.023133 |
| 4 | 773 | 17.2 | 0.022251 |
| 5 | 747 | 14.4 | 0.019277 |
| 6 | 681 | 8.92 | 0.013098 |

Therefore, the increase of Hc is considered to be caused by the increase of A. Moreover, considering together with the result of structural analysis indicated in FIGS. 2 and 3, the following can be considered.

From the result of the structural analysis, since a change in the axial lengths of the c-axis and the a-axis was small, and the order parameter S was substantially constant, it can be presumed that V is not contained in the crystal of FePt. That is, it can be considered that, a V grain boundary was formed outside the magnetic crystal grains of FePt by addition of V to the FePt ordered alloy, the separation performances between the magnetic crystal grains was improved, and as a result, Hc increased.

Moreover, in the composition of FePt, the reason why Hc increases in the case of Fe<Pt is not known, but it can be considered that easier segregation of V to the grain boundary results in improvement of separability of the magnetic crystal grains.

As described above, it is known that addition of V to the $L1_0$-ordered alloy is effective for development of excellent magnetic properties.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A magnetic recording medium comprising: at least a non-magnetic substrate; and a magnetic recording layer, said magnetic recording layer comprising an ordered alloy having an $L1_0$-ordered structure, comprising Fe, Pt, and V, having a Fe content of 40 to 45 at % and a Pt content of 45 to 55 at % with the proviso that a composition of Fe and Pt is Pt>Fe, and having a V content of 3.7 to 11.6 at %.

2. The magnetic recording medium according to claim 1, wherein
said magnetic recording layer has a granular structure composed of magnetic crystal grains comprising said ordered alloy and a non-magnetic crystal grain boundary, and said non-magnetic crystal grain boundary comprises V.

3. The magnetic recording medium according to claim 1, further comprising:
a seed layer, said seed layer comprising Pt.

* * * * *